United States Patent [19]

Matsushima

[11] Patent Number: 5,552,834
[45] Date of Patent: Sep. 3, 1996

[54] APPARATUS FOR DISPLAYING AN IMAGE IN A REDUCED SCALE BY SAMPLING OUT AN INTERLACE VIDEO SIGNAL UNIFORMLY IN A VERTICAL DIRECTION WITHOUT SAMPLING OUT SUCCESSIVE LINES

[75] Inventor: Koh Matsushima, Tokyo, Japan

[73] Assignee: NEC Corporation, Tokyo, Japan

[21] Appl. No.: 356,846

[22] Filed: Dec. 15, 1994

[30] Foreign Application Priority Data

Dec. 16, 1993 [JP] Japan .................................. 5-316153

[51] Int. Cl.$^6$ ........................................................ H04N 5/262
[52] U.S. Cl. .......................................... 348/581; 348/458
[58] Field of Search .................................. 348/581, 582, 348/580, 568, 567, 566, 561, 704, 458, 447, 445, 443, 441, 720; 345/129; 395/139; H04N 5/262, 5/14, 7/01

[56] References Cited

U.S. PATENT DOCUMENTS

| | | | |
|---|---|---|---|
| 4,134,128 | 1/1979 | Hurst | 348/581 |
| 4,412,252 | 10/1983 | Moore et al. | 348/581 |
| 4,472,732 | 9/1984 | Bennett et al. | 348/581 |
| 4,661,987 | 4/1987 | Anderson et al. | 348/581 |
| 5,025,315 | 6/1991 | Johary et al. | 348/704 |
| 5,043,811 | 8/1991 | Yasuhiro | 348/458 |
| 5,276,515 | 1/1994 | Katsumata et al. | 348/704 |
| 5,351,087 | 9/1994 | Christopher et al. | 348/581 |

FOREIGN PATENT DOCUMENTS

| | | | |
|---|---|---|---|
| 4-37962 | 2/1992 | Japan | G06F 15/66 |
| 5-134656 | 5/1993 | Japan | G09G 5/36 |

*Primary Examiner*—Safet Metjahic
*Attorney, Agent, or Firm*—Sughrue, Mion, Zinn, Macpeak & Seas

[57] ABSTRACT

An image reduction apparatus is disclosed which can sample and reduce an interlace video signal such as a digital video signal uniformly in a vertical direction without sampling out successive lines. A non-delayed horizontal synchronizing signal and a delayed horizontal synchronizing signal are logically ANDed to obtain a double-speed horizontal synchronizing signal having a double speed to that of the horizontal synchronizing signal. The double-speed horizontal synchronizing signal is sampled in accordance with a vertical reduction rate by a vertical sampling circuit to obtain a vertical sampling signal. In the first field, the vertical sampling signal and a vertical address signal are latched into respective latch circuits in response to the non-delayed horizontal synchronizing signal, but in the second field, the signals are latched similarly in response to the delayed horizontal synchronizing signal. Writing of image data into a frame memory is controlled by the vertical sampling signal outputted from the corresponding latch circuit while designating an address of the frame memory in the vertical direction by the vertical address signal outputted from the corresponding latch circuit.

2 Claims, 7 Drawing Sheets

FIG.7 PRIOR ART

ORIGINAL IMAGE DATA

INTERLACE IMAGE

| FIRST FIELD | |
|---|---|
| 0TH LINE (D0L) | 0 |
| 1ST LINE (D1L) | 0 |
| 2ND LINE (D2L) | X |
| 3RD LINE (D3L) | 0 |
| 4TH LINE (D4L) | 0 |
| 5TH LINE (D5L) | X |

| SECOND FIELD | |
|---|---|
| 0TH LINE (E0L) | 0 |
| 1ST LINE (E1L) | 0 |
| 2ND LINE (E2L) | X |
| 3RD LINE (E3L) | 0 |
| 4TH LINE (E4L) | 0 |
| 5TH LINE (E5L) | X |

NON-INTERLACE IMAGE

| | |
|---|---|
| D0L | 0 |
| E0L | 0 |
| D1L | 0 |
| E1L | 0 |
| D2L | X |
| E2L | X |
| D3L | 0 |
| E3L | 0 |
| D4L | 0 |
| E4L | 0 |
| D5L | X |
| E5L | X |

IMAGE DATA WRITTEN IN FRAME MEMORY

| ADDRESS | |
|---|---|
| 0 | D0L |
| 1 | E0L |
| 2 | D1L |
| 3 | E1L |
| 4 | D3L |
| 5 | E3L |
| 6 | D4L |
| 7 | E4L |

APPARATUS FOR DISPLAYING AN IMAGE IN A REDUCED SCALE BY SAMPLING OUT AN INTERLACE VIDEO SIGNAL UNIFORMLY IN A VERTICAL DIRECTION WITHOUT SAMPLING OUT SUCCESSIVE LINES

BACKGROUND OF THE INVENTION

1. Field of the Invention

This invention relates to an apparatus for displaying an image in a reduced scale, and more particularly to an image reduction apparatus which reduces an interlace video signal such as an NTSC (National Television System Committee) signal or a PAL (Phase Alternation Line) signal.

2. Description of the Related Art

An exemplary construction of conventional image reduction apparatus is shown in FIG. 4. Referring to FIG. 4, the image reduction apparatus includes a horizontal sampling circuit 12, a horizontal address counter 13, a vertical sampling circuit 14, a vertical address counter 15, a write control circuit 16 and a frame memory 17.

Operation of the image reduction apparatus where the reduction rate is set to ⅔ is illustrated in time charts of FIGS. 5 and 6. In particular, FIG. 5 illustrates the operation when a video signal is reduced in a horizontal direction while FIG. 6 illustrates the operation when a video signal is reduced in a vertical direction. Referring to FIGS. 4 to 6, the horizontal sampling circuit 12 starts a sampling operation of a clock signal 111 when a horizontal, pixel signal 112 changes over to a HIGH level, and outputs a horizontal sampling signal 113 in accordance with a preset horizontal reduction rate in synchronism with the clock signal 111. The vertical sampling circuit 14 starts a sampling operation of a horizontal synchronizing signal 115 when a vertical pixel signal 116 changes over to a HIGH level, and outputs a vertical sampling signal 117 in accordance with a preset vertical reduction rate in synchronism with the horizontal synchronizing signal 115.

The horizontal address counter 13 increments its count value by one when the clock signal 111 rises while the horizontal sampling signal 113 remains at a HIGH level, but resets its count value to zero when the horizontal synchronizing signal 115 changes over to a LOW level. An output 114 of the horizontal address counter 13 designates a horizontal address of the frame memory 17.

The vertical address Counter 15 increments its count value by one when the horizontal synchronizing signal 115 rises while the vertical sampling signal 117 remains at a HIGH level, and outputs a value twice its count value with the LSB (Least Significant Bit) thereof set to "0" when a vertical synchronizing signal 121 is at a LOW level (first field), but outputs a value twice its count value with the LSB thereof set to "1" when a field change-over signal 122 is at a HIGH level (second field). An output 118 of the vertical address counter 15 designates a vertical address of the frame memory 17.

The write control circuit 16 outputs a write signal 119 for writing image data 120 into the frame memory 17 when the horizontal sampling signal 113 is at a HIGH level and the vertical sampling signal 117 is at a HIGH level.

With the conventional image reduction apparatus of FIG. 4, however, since the vertical sampling circuit 14 repeats a same operation for each vertical synchronizing signal, same lines in the first field and the second field are sampled out, and in the case of a non-interlace image, two successive lines are sampled out or abandoned. The manner Just described is illustrated in FIG. 7. Referring to FIG. 7, in this instance, the vertical reduction rate is ⅔, and a line sampled out is indicated by X. The second line (D2L), the fifth line (D5L), the eighth line (D8L), . . . in the first field and the second line (E2L), the fifth line (E5L), the eighth line (ESL), . . . are sampled out and the remaining data are written into the frame memory 17. When read out and display of the data in a non-interlaced relationship from the frame memory 17 occurs, the data are read out in order of D0L, E0L, D1L, E1L, D3L, E3L, D4L, E4L, D6L, E6L, . . . while individual two successive lines of D2L and E2L, DSL and E5L, . . . are sampled out. Accordingly, there is a problem in that the discontinuity at such sampled out portions degrades the picture quality.

SUMMARY OF THE INVENTION

It is an object of the present invention to provide an image reduction apparatus which can sample out an interlace video signal uniformly in a vertical direction to reduce the interface video signal in the vertical direction without sampling out successive lines.

In order to attain the object described above, according to the present invention, there is provided an image reduction apparatus, which comprises a frame memory for storing image data, a delay circuit for delaying a horizontal synchronizing signal, an AND circuit for logically ANDing the non-delayed horizontal synchronizing signal and the horizontal synchronizing signal delayed by the delay circuit and outputting a double-speed horizontal synchronizing signal having a double speed to that of the horizontal synchronizing signal, a vertical sampling circuit for sampling the double-speed horizontal synchronizing signal in accordance with a vertical reduction rate for an image to generate a vertical sampling signal, a vertical address counter for receiving the vertical sampling signal to generate a vertical address signal, a selection circuit for selectively outputting one of the non-delayed horizontal synchronizing signal and the horizontal synchronizing signal delayed by the delay circuit in response to a field change-over signal, a vertical sampling signal latch circuit for latching the vertical sampling signal from the vertical sampling circuit in response to the horizontal synchronizing signal selected by the selection circuit, a vertical address latch circuit for latching the vertical address signal from the vertical address counter in response to the horizontal synchronizing signal selected by the selection circuit and outputting the latched vertical address signal to the frame memory, and a write control circuit for receiving the vertical sampling signal outputted from the vertical sampling signal latch circuit to control writing into the frame memory.

In the image reduction apparatus, a non-delayed horizontal synchronizing signal and a delayed horizontal synchronizing signal are logically ANDed to obtain a double-speed horizontal synchronizing signal having a double speed to that of the horizontal synchronizing signal. The double-speed horizontal synchronizing signal is sampled in accordance with a vertical reduction rate to obtain a vertical sampling signal. In the first field, a vertical sampling signal and a vertical address signal are latched in response to the non-delayed horizontal synchronizing signal, but in the second field, the vertical sampling signal and the vertical address signal are latched in response to the delayed horizontal synchronizing signal. Consequently, lines can be thinned or sampled out in a non-interlace image, and sampled out lines do not appear successively. Consequently, otherwise possible degradation in picture quality can be prevented.

In order to allow reduction of the image also in a horizontal direction, the image reduction apparatus may additionally comprise a horizontal sampling circuit for sampling a clock signal in accordance with a horizontal reduction rate for an image to generate a horizontal sampling signal, and a horizontal address counter for receiving the horizontal sampling signal to generate a horizontal address signal for the frame memory. In this instance, the write control circuit receives, in addition to the vertical sampling signal outputted from the vertical sampling signal latch circuit, the horizontal sampling signal outputted from the horizontal sampling circuit to control writing into the frame memory.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 7 is a diagram illustrating an exemplary image reduction operation in a vertical direction by the image reduction apparatus of FIG. 4.

DESCRIPTION OF THE PREFERRED EMBODIMENT

Figure 1:
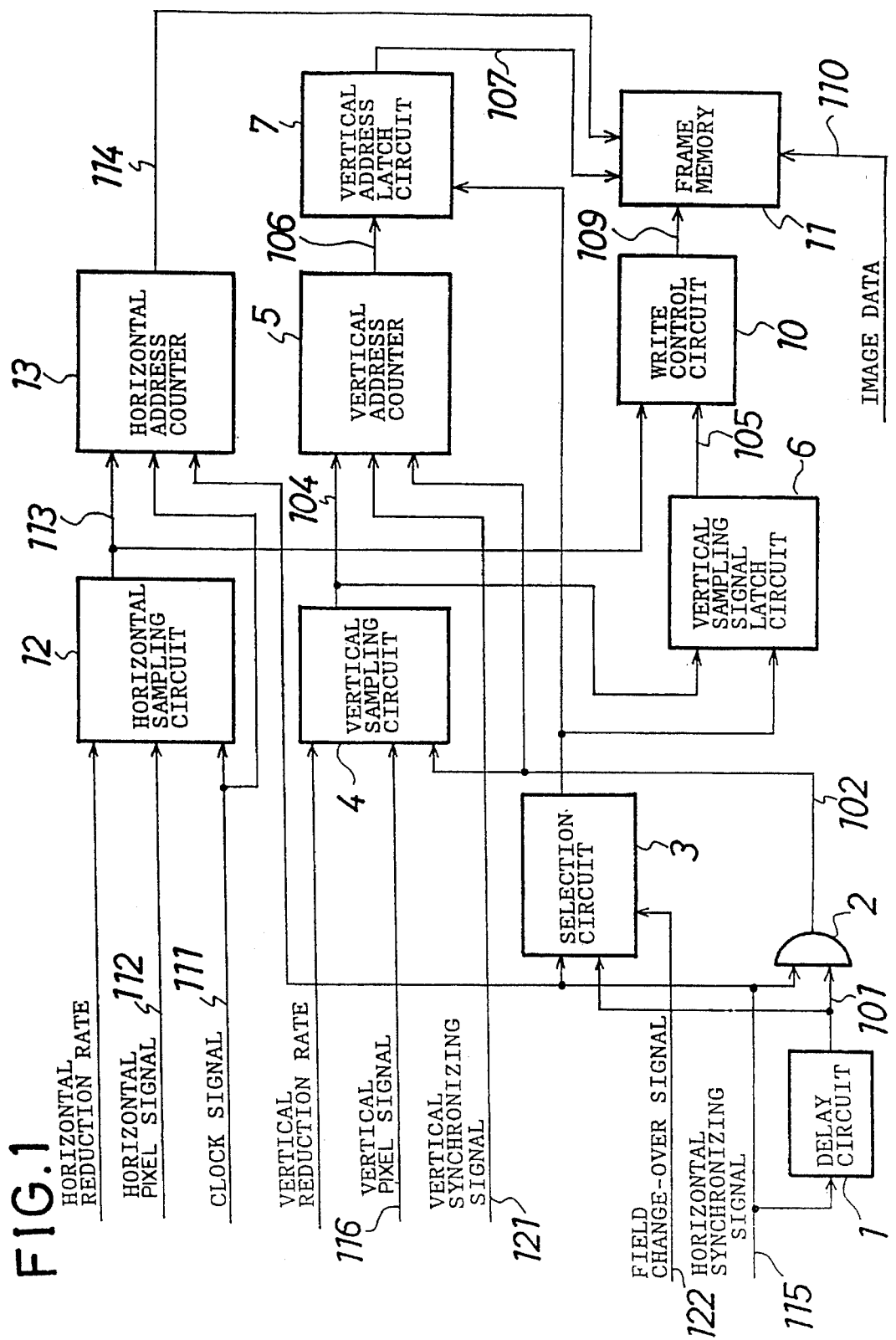
FIG. 1 is a block diagram of an image reduction apparatus showing a preferred embodiment of the present invention.

Referring first to FIG. 1, there is shown an image reduction apparatus according to a preferred embodiment of the present invention. The image reduction apparatus shown includes a delay circuit 1 for delaying a horizontal synchronizing signal 115, an AND circuit 2 for logically ANDing the non-delayed horizontal synchronizing signal 115 and a horizontal synchronizing signal 101 obtained by delaying the horizontal synchronizing signal is by the delay circuit 1, a selection circuit 3 for selectively outputting one of the non-delayed horizontal synchronizing signal 115 and the delayed horizontal synchronizing signal 101 in response to a field change-over signal 122, a vertical sampling circuit 4 for outputting a vertical sampling signal 104 in accordance with a vertical reduction rate, a frame memory 11 for storing video data, a vertical address counter 5 for generating an address signal in a vertical direction of the frame memory 11, a vertical sampling signal latch circuit 6 for latching the vertical sampling signal 104, a vertical address latch circuit 7 for latching the address signal from the vertical address counter 5, a horizontal sampling circuit 12 for outputting a horizontal sampling signal 113 in accordance with a horizontal reduction rate, a horizontal address counter 13 for generating an address signal in a horizontal direction of the frame memory 11, and a write control circuit 10 for controlling writing of image data into the frame memory 11 in response to an output 105 of the vertical sampling signal latch circuit 6 and the horizontal sampling signal 113.

Figure 2:
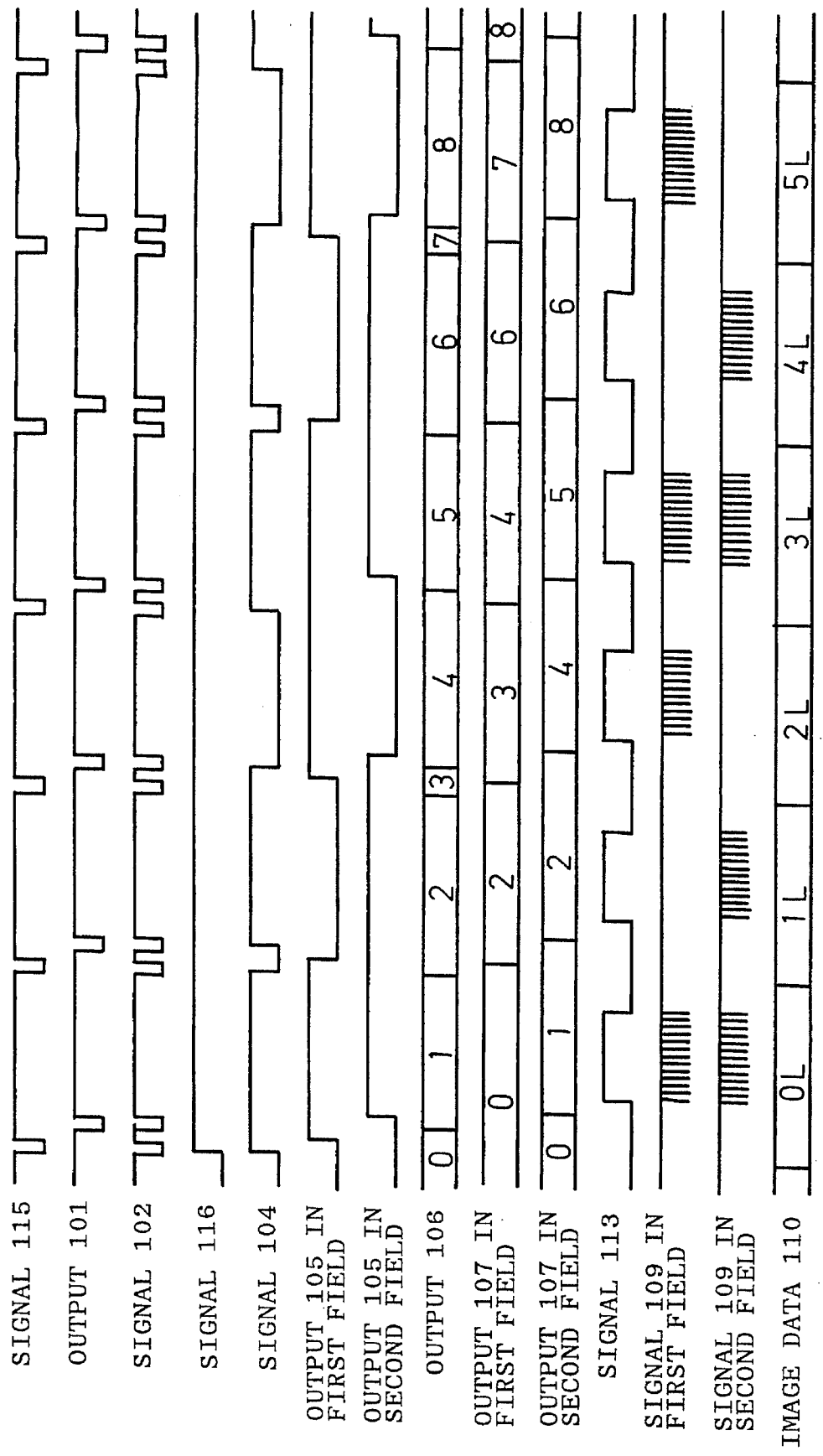
FIG. 2 is a time chart illustrating operation of the image reduction apparatus of FIG. 1.
Figure 4:
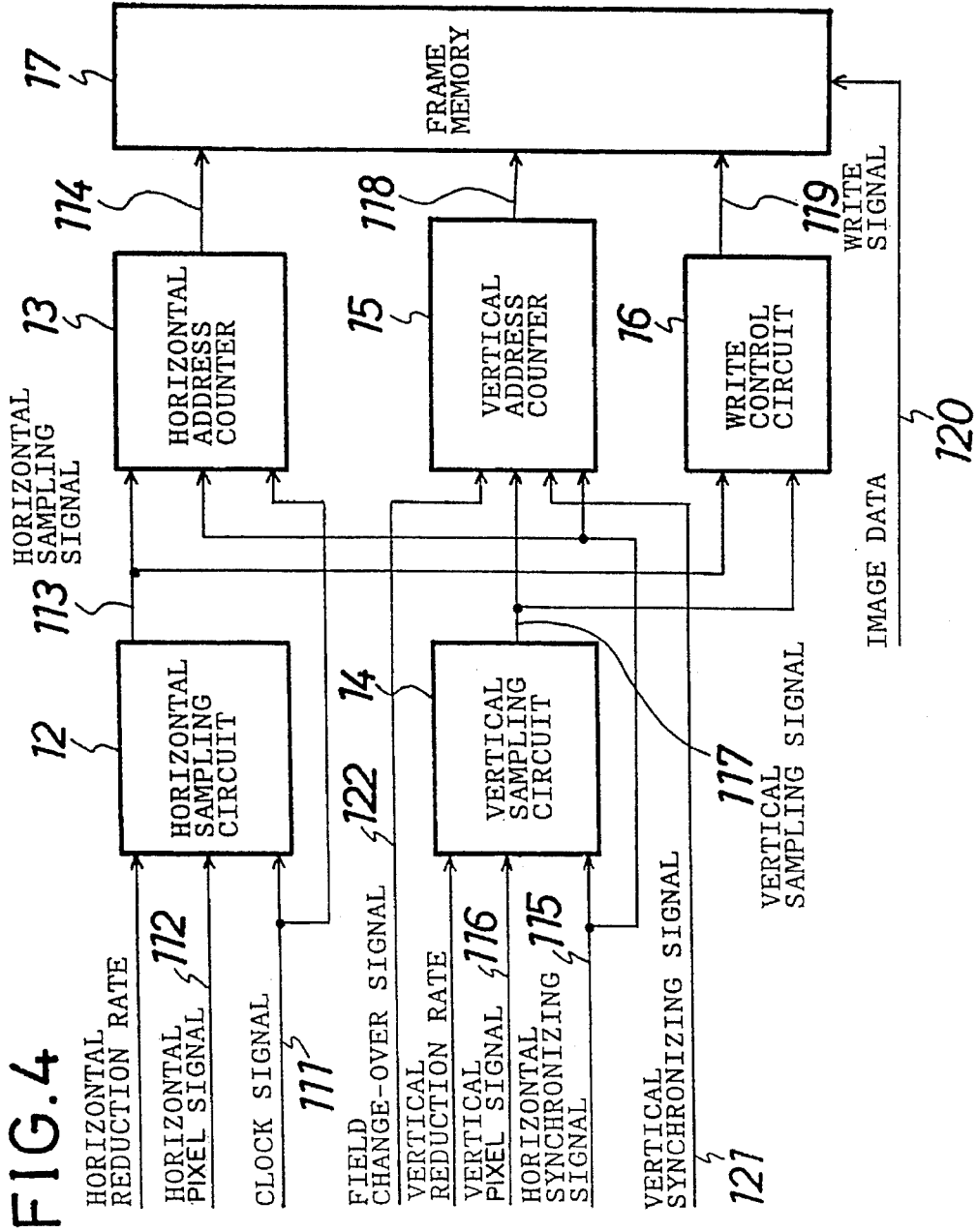
FIG. 4 is a block diagram showing an exemplary conventional image reduction apparatus.
Figure 5:
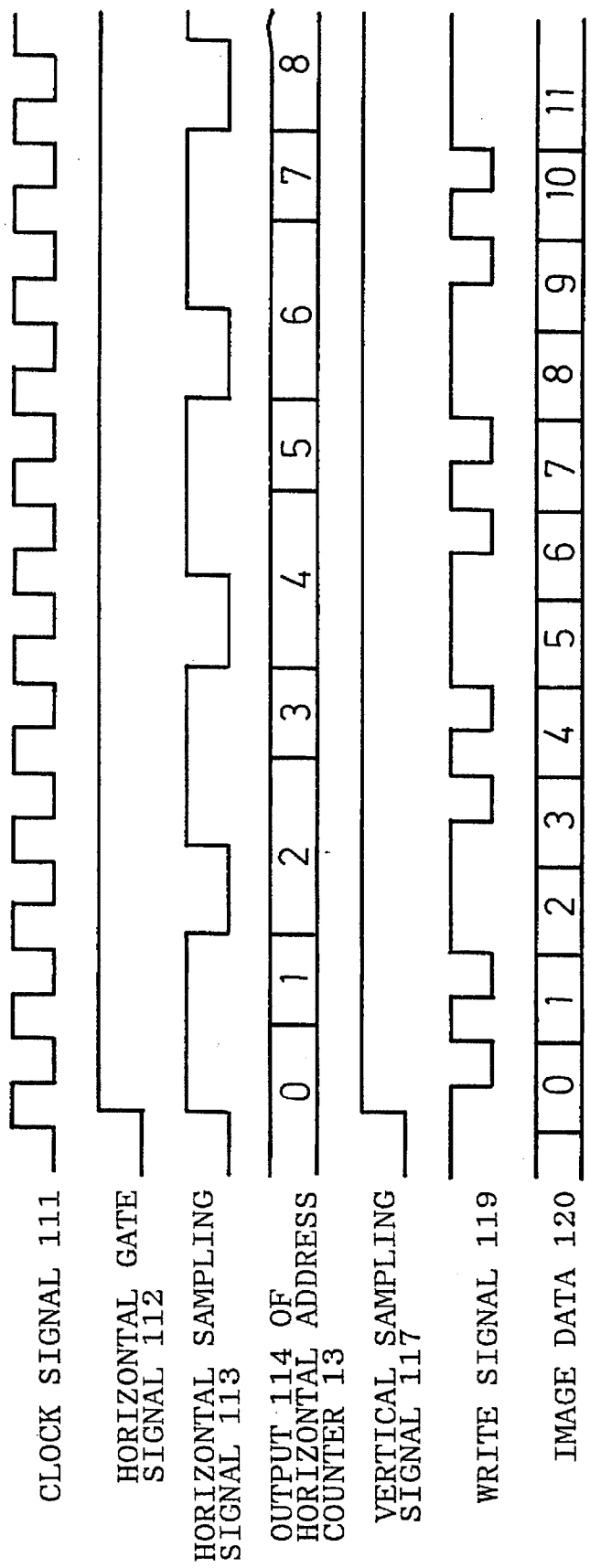
FIG. 5 is a time chart illustrating an image reduction operation in a horizontal direction of the image reduction apparatus of FIG. 4.
Figure 6:
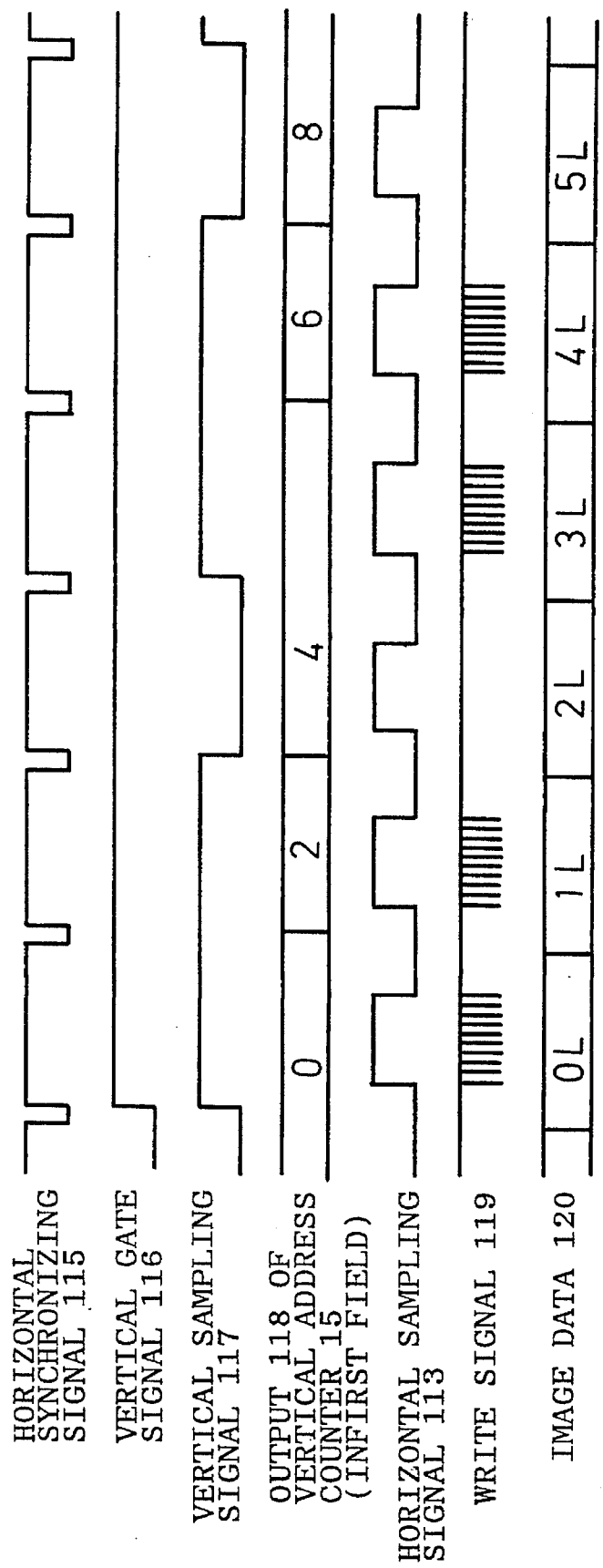
FIG. 6 is a time chart illustrating an image reduction operation in a vertical direction of the image reduction apparatus of FIG. 4.

A reduction operation in a horizontal direction of the image reduction apparatus by the horizontal sampling circuit 12 and the horizontal address counter 13 is similar to that of the conventional image reduction apparatus shown in FIG. 4, and accordingly, only a reduction operation in a vertical direction will be described below with reference to FIG. 2 while omitting overlapping description of the reduction operation in a horizontal direction. In this instance, the vertical reduction rate is assumed to be ⅔.

The horizontal synchronizing signal 115 and the horizontal synchronizing signal 101 delayed by the delay circuit 1 are logically ANDed by the AND circuit 2 so that a double speed horizontal synchronizing signal 102 which is a signal of a double speed to that of the horizontal synchronizing signal 115 is obtained from the AND circuit 2. The selection circuit 3 selectively outputs the horizontal synchronizing signal 115 when the field change-over signal 122 indicates the first field, but selectively outputs the horizontal synchronizing signal 101 delayed by the delay circuit 1 when the field change-over signal 122 indicates the second field.

The vertical sampling circuit 4 starts a sampling operation of the double speed horizontal synchronizing signal 102 at the point of time when the vertical gate signal 116 changes over to a HIGH level, and changes the vertical sampling signal 104 to a LOW level in synchronism with a falling edge of the double speed horizontal synchronizing signal 102, in the present case, at the rate of one time to three times and keeps the vertical sampling signal 104 of the LOW level for one period (from a falling edge to a next falling edge). The vertical sampling signal latch circuit 6 latches the vertical sampling signal 104 at a rising edge of the output of the selection circuit 3.

The write control circuit 10 enables a write signal 109 for writing image data 110 into the frame memory 11 when the horizontal sampling signal 113 is at a HIGH level and the output 105 of the vertical sampling signal latch circuit 6 is at a HIGH level.

An output 106 of the vertical address counter 5 increments its count value by one in response to a falling edge of the double speed horizontal synchronizing signal 102 when the vertical sampling signal 104 is at a HIGH level.

Figure 3:
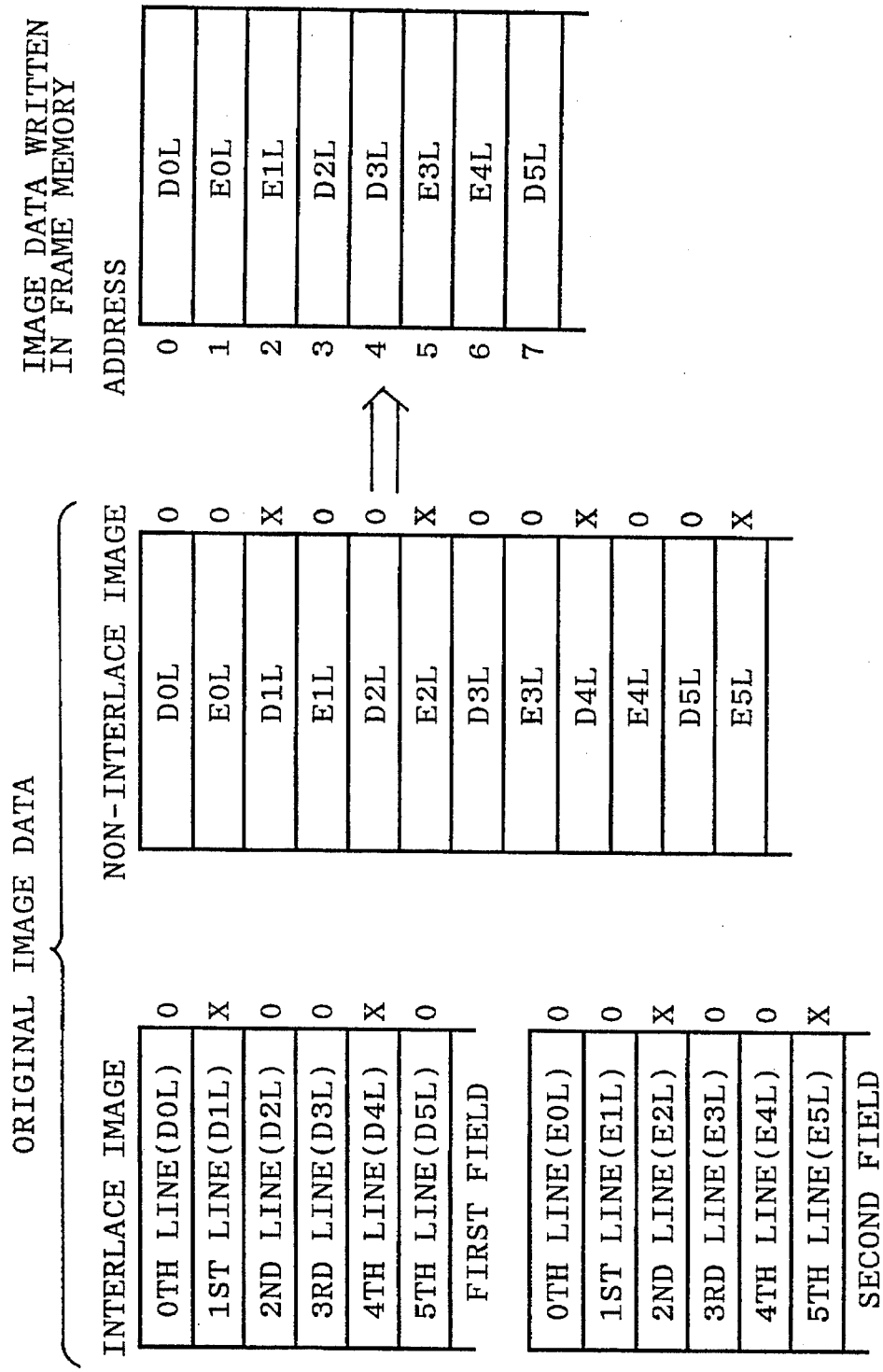
FIG. 3 is a diagrammatic view illustrating an exemplary image reduction operation in a vertical direction by the image reduction apparatus of FIG. 1.

The vertical address latch circuit 7 latches the output 106 of the vertical address counter 5 at a rising edge of the output of the selection circuit 3 and outputs the latched signal as a vertical address signal 107 for the frame memory 11. As a result of the operations described above, thee image data 110 are written into the frame memory 11 in order of the 0th line (D0L) of the first field, the 0th line (E0L) of the second field, the first line (E1L) of the second field, the second line (D2L) of the first field, the third line (D3L) of the first field, ... as seen in FIG. 3.

Having now fully described the invention, it will be apparent to one of ordinary skill in the art that many changes and modifications can be made thereto without departing from the spirit and scope of the invention as set forth herein.

What is claimed is:

1. An image reduction apparatus, comprising:
   a frame memory for storing image data;
   a delay circuit for delaying a horizontal synchronizing signal;

an AND circuit for logically ANDing the non-delayed horizontal synchronizing signal and the horizontal synchronizing signal delayed by said delay circuit and outputting a double-speed horizontal synchronizing signal having a speed double to that of the horizontal synchronizing signal;

a vertical sampling circuit for sampling the double-speed horizontal synchronizing signal in accordance with a vertical reduction rate for an image to generate a vertical sampling signal;

a vertical address counter for receiving the vertical sampling signal to generate a vertical address signal;

a selection circuit for selectively outputting one of the non-delayed horizontal synchronizing signal and the horizontal synchronizing signal delayed by said delay circuit in response to a field change-over signal;

a vertical sampling signal latch circuit for latching the vertical sampling signal from said vertical sampling circuit in response to the horizontal synchronizing signal selected by said selection circuit;

a vertical address latch circuit for latching the vertical address signal from said vertical address counter in response to the horizontal synchronizing signal selected by said selection circuit and outputting the latched vertical address signal to said frame memory; and a write control circuit for receiving the vertical sampling signal outputted from said vertical sampling signal latch circuit to control writing into said frame memory.

2. An image reduction apparatus, comprising:

a frame memory for storing image data;

a horizontal sampling circuit for sampling a clock signal in accordance with a horizontal reduction rate for an image to generate a horizontal sampling signal;

a horizontal address counter for receiving the horizontal sampling signal to generate a horizontal address signal for said frame memory;

a delay circuit for delaying a horizontal synchronizing signal;

an AND circuit for logically ANDing the non-delayed horizontal synchronizing signal and the horizontal synchronizing signal delayed by said delay circuit and outputting a double-speed horizontal synchronizing signal having a speed double to that of the horizontal synchronizing signal;

a vertical sampling circuit for sampling the double-speed horizontal synchronizing signal in accordance with a vertical reduction rate for an image to generate a vertical sampling signal;

a vertical address counter for receiving the vertical sampling signal to generate a vertical address signal;

a selection circuit for selectively outputting one of the non-delayed horizontal synchronizing signal and the horizontal synchronizing signal delayed by said delay circuit in response to a field change-over signal;

a vertical sampling signal latch circuit for latching the vertical sampling signal from said vertical sampling circuit in response to the horizontal synchronizing signal selected by said selection circuit;

a vertical address latch circuit for latching the vertical address signal from said vertical address counter in response to the horizontal synchronizing signal selected by said selection circuit and outputting the latched vertical address signal to said frame memory; and a write control circuit for receiving the vertical sampling signal outputted from said vertical sampling signal latch circuit and the horizontal sampling signal outputted from said horizontal sampling circuit to control writing into said frame memory.

\* \* \* \* \*

UNITED STATES PATENT AND TRADEMARK OFFICE
CERTIFICATE OF CORRECTION

PATENT NO. : 5,552,834
DATED : September 3, 1996
INVENTOR(S) : Koh MATSUSHIMA

It is certified that error appears in the above-indentified patent and that said Letters Patent is hereby corrected as shown below:

Column 2, line 7, delete "ESL" and insert --E8L--.

Column 2, line 13, delete "DSL" and insert --D5L--.

Column 3, line 55, after "signal" delete "is" and insert --115--.

Column 4, line 52, delete "thee" and insert --the--.

Signed and Sealed this

Thirty-first Day of December, 1996

*Attest:*

BRUCE LEHMAN

*Attesting Officer*   *Commissioner of Patents and Trademarks*